Aug. 23, 1949.　　　　　D. T. STREET　　　　　2,479,789
ADJUSTABLE RETICLE
Filed March 9, 1945

DONALD T. STREET
INVENTOR

BY *M. A. Ellestad*
ATTORNEY

Patented Aug. 23, 1949

2,479,789

UNITED STATES PATENT OFFICE 2,479,789

ADJUSTABLE RETICLE

Donald T. Street, Rochester, N. Y., assignor to Bausch & Lomb Optical Company, Rochester, N. Y., a corporation of New York Application March 9, 1945, Serial No. 581,756

1 Claim. (Cl. 33—50)

This invention relates to gun sights and more particularly it has reference to telescope gun sights embodying reticles which may be adjusted vertically to compensate for range and horizontally to compensate for windage.

One of the objects of this invention is to provide a telescope sight having improved means for horizontally and vertically adjusting the reticle. Another object is to provide an improved telescope sight embodying a structure which will be water and dust proof while still providing means for independently adjusting the reticle by positive movements in either horizontal or vertical directions. A further object is to provide an improved telescope sight embodying reticle adjusting means which will be relatively simple in structure yet positive and efficient in operation. These and other objects and advantages reside in certain novel features of construction, arrangement, and combination of parts as will hereinafter be more fully explained and pointed out in the appended claim.

Referring to the drawings.

Figure 1:
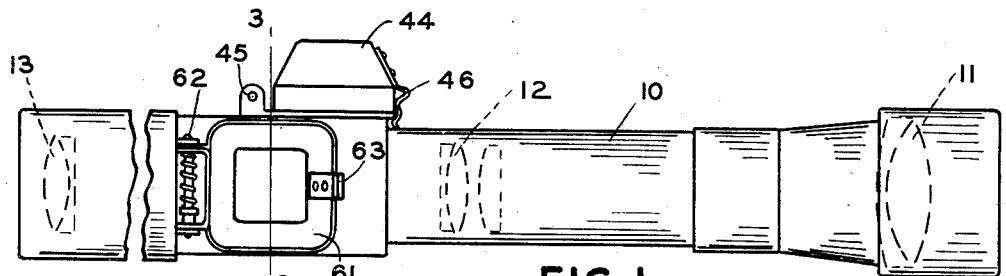
Fig. 1 is a side view of a telescope sight embodying my invention.
Figure 2:
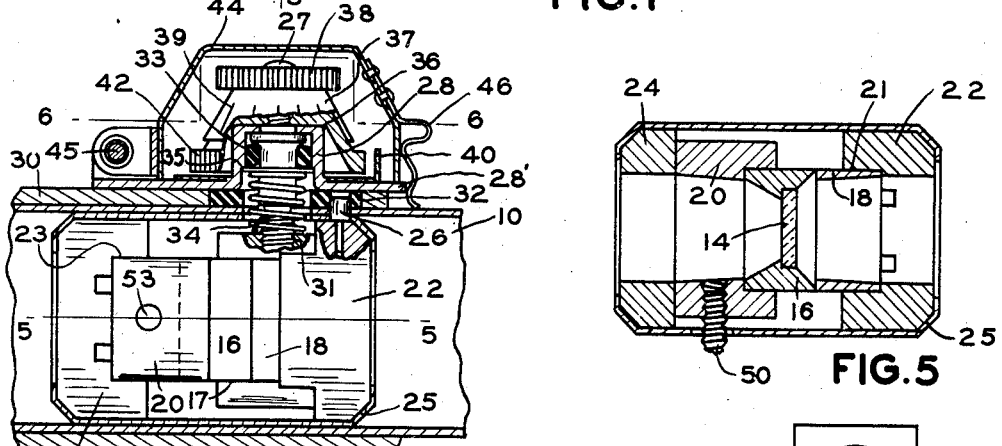
Fig. 2 is a fragmentary longitudinal sectional view, with parts in elevation, showing the means for vertically adjusting the reticle.
Figure 5:
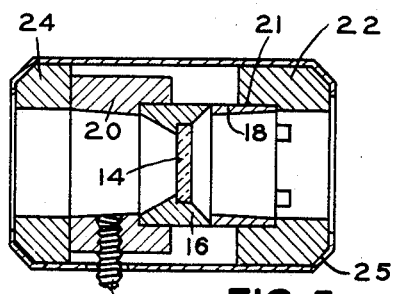
Fig. 5 is a horizontal sectional view taken through the assembly of the reticle holder and associated parts.
Figure 7:
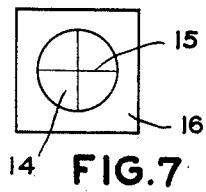
Fig. 7 is a face view of the reticle and holder.
Figure 4:
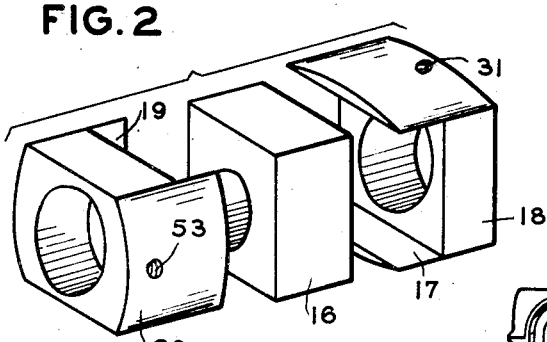
Fig. 4 is an exploded view showing the reticle holder and its associated guide members.

A preferred embodiment of my invention is illustrated in the drawings wherein 10 indicates the tubular body of a telescope sight embodying the eye lens 11 and the lenses 12 and 13. Positioned between the lenses 12 and 13 is the glass reticle plate 14 carrying the reticle lines 15. The reticle plate 14 is mounted in a holder 16 which has rectangular side portions as shown in Fig. 4. The reticle holder 16 is slidably mounted to move horizontally in the horizontal slideway 17 formed on the adjacent side of apertured guide member 18. The reticle holder 16 is also slidably mounted to move vertically in the slideway 19 formed on the adjacent side of the apertured guide member 20. The guide member 18 is slidably mounted for vertical movement on track portions 21 formed on the adjacent side of apertured block 22. The guide member 20 is slidably mounted to move horizontally on the track portions 23 formed on the adjacent face of apertured block 24. The reticle holder 16 and the associated guide members and blocks are held in assembled relation by means of a surrounding sheet metal casing 25 so that the assembly may be slid into the tube 10 as a unit and held in position therein by suitable means such as the pin 26 which extends through openings in the walls of tube 10, casing 25, and block 22.

Figure 6:
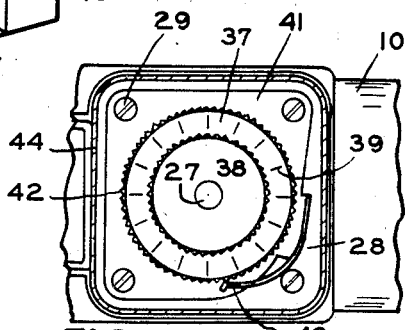
Fig. 6 is a view taken along the line 6—6 of Fig. 2.

Vertical movement of the reticle holder 16 may be effected by means of the screw 27 which is rotatably mounted in the apertured bearing member 28 carried by plate 28' secured by screws 29 to the sleeve 30 which is sweated to the outside of tube 10. The screw 27, extending through aligned apertures, has its lower end in threaded engagement with the threaded opening 31 formed on the upper side of the guide member 18. In order to prevent the entry of moisture, dust, or the like, a gasket member 32 is placed between the bearing member 28 and the tube 10, and the gasket member 33 is placed between the bearing member 28 and the rotatable screw 27. To take up lost motion, a coil spring 34 is positioned around the lower end of screw 27 so that it bears on guide member 18 and a washer 35 contacting the bearing member 28. A frusto-conical nut 36 is threaded onto the upper end of screw 27 and is surmounted by a second frusto-conical member 37 which is held in place by knurled nut 38. The outer surface of member 37 carries suitable scale indicia 39 which cooperate with a fiducial mark carried by an upturned portion 40 integral with plate 41 which is also secured by screws 29, as shown in Fig. 6. The periphery of the lower end of nut 36 is provided with notches 42 which coact with a resilient detent 43 carried by plate 41 so that the indicia 39 of the scale may be held in selected position relative to the fiducial mark on the portion 40. In order to protect the adjusting screw against damage, a suitable cover 44 is hingedly mounted at 45 and adapted to be held in closed position by means of resilient catch 46.

Figure 3:
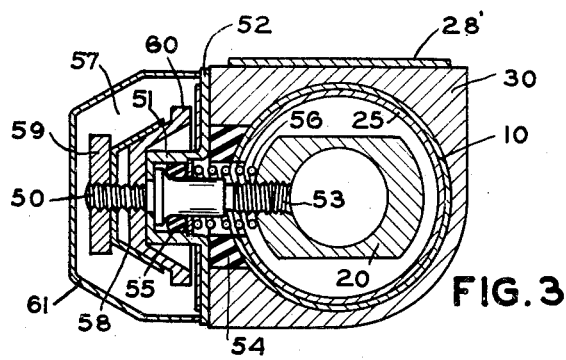
Fig. 3 is a sectional view taken on line 3—3 of Fig. 1 and showing the means for adjusting the reticle horizontally.

The horizontal adjustment of the reticle is effected by a similar mechanism which is shown in Fig. 3 as embodying a screw 50 rotatably mounted in a bearing member 51 formed on plate 52 which is secured to sleeve 30. The screw 50 extends through aligned openings so that its inner threaded end is in threaded engagement with the threaded opening 53 formed in guide member 20. In order to prevent the entry of moisture, dust, or the like into the tube 10, the space between the plate 52 and the tube 10 is sealed by a gasket member 54 and the gasket 55 is positioned between the screw 50 and the bearing member 51. A coil spring 56, surrounding the screw 50, serves to take up lost motion. A frusto-conical nut member 57 is threaded to the outer end of screw 50 and is surmounted by another frusto-conical member 58 which is held in place by means of the knurled nut 59. The outer surface of the member 58 carries indicia means and the portion 60 of nut 57 carries peripherally disposed notches which cooperate with a spring detent to hold screw 50 in selected adjusted position. Although the indicia means, notches, and spring detent are not shown, they have the same structure and function as those disclosed in connection with the vertical adjustment screw 27 and so it is thought that their construction and function will be understood by those skilled in the art. A suitable protecting cover 61 is hinged at 62 and adapted to be held in closed position by means of resilient catch 63.

In operation of my device, the reticle 15 may be vertically adjusted to compensate for range by turning the knurled nut 38 into selected position as determined from the indicia 39. Rotation of the vertical screw 27 will cause the guide member 18 to move vertically on the track portions 21. Since the reticle holder 16 is mounted on the horizontal slideway 17, such vertical movement of guide member 18 will cause the reticle holder 16 to also move vertically. It is to be understood that the reticle holder 16 is thicker than the combined depths of the slideways 17 and 19 formed, respectively, on guide members 18 and 20. Similarly, the reticle may be horizontally moved by means of the knurled nut 59 which will turn screw 50 and thereby cause the guide member 20 to be horizontally moved on the track portions 23 of block 24. It will be understood that such horizontal movement of guide member 20 will also horizontally move reticle holder 16 since the latter is mounted for only vertical movement in the slideway 19.

It will thus be apparent that the reticle may be adjusted independently in either vertical or horizontal directions. All of such adjustments are made by positive movements caused by the rotation of the respective adjusting screws. Since the adjusting screws merely rotate about their axes and are both constrained against lateral movement, it is possible to provide gasket means for effectively sealing out moisture and dust particles from the interior of tube 10. It will, therefore, be apparent that I am able to attain the objects of my invention and provide a telescope sight embodying improved means for selectively adjusting the reticle in horizontal or vertical planes. Various modifications can obviously be made without departing from the spirit of my invention as pointed out in the appended claim.

I claim:

In a telescope sight, the combination of a tube, a casing within the tube, a pair of spaced apertured blocks held within the casing, said blocks being provided, respectively, with vertical and horizontal track portions, a guide member slidably mounted on each of the respective track portions, two projections extending at right angles from the adjacent faces of the respective guide members, the projections on one guide member providing a pair of vertically positioned plane slideways, the projections on the other guide member providing a pair of horizontally positioned plane slideways, a reticle holder having a rectangular shape and provided with plane surfaces on its top, bottom and sides, said holder positioned between the projections with the plane surfaces slidably engaging the respective pairs of slideways whereby the reticle holder may be moved vertically and horizontally, a reticle in the holder and means on the tube for selectively moving the holder in vertical and horizontal directions, said casing confining the blocks, guide members and holder and retaining them in assembled relation.

DONALD T. STREET.

REFERENCES CITED

The following references are of record in the file of this patent:

UNITED STATES PATENTS

| Number | Name | Date |
|---|---|---|
| 1,704,059 | Packard, Jr. | Mar. 5, 1929 |
| 2,078,858 | Kuhn | Apr. 27, 1937 |
| 2,150,629 | Mossberg | Mar. 14, 1939 |
| 2,281,772 | Klemperer | May 5, 1942 |
| 2,302,444 | Howell | Nov. 17, 1942 |
| 2,344,887 | Liebl | Mar. 21, 1944 |
| 2,452,592 | Meyer | Nov. 2, 1948 |